Patented May 23, 1950

2,508,447

UNITED STATES PATENT OFFICE 2,508,447

AZO PIGMENT AND ALKYD RESIN COATING COMPOSITIONS CONTAINING SAME

Joseph H. Cooper, San Francisco, Calif., assignor to E. I. du Pont de Nemours & Company, Wilmington, Del., a corporation of Delaware No Drawing. Application February 19, 1946, Serial No. 648,835

3 Claims. (Cl. 260—40)

This invention relates to azo pigment dyestuffs, and more particularly to a novel azo dyestuff derived from the coupling of 5-nitro-2-aminoanisole diazo with "Naphthanil" ASD (ortho toluidide of beta hydroxy naphthoic acid) which exhibits exceptionally high durability, color and light-fastness properties, particularly when employed in automotive finishes or synthetic resin enamels.

Pigments which are to be used in the preparation of coating compositions for automotive finishes must conform to extremely rigid requirements. Of the exceedingly large number of azo pigment dyestuffs known and described in the art, only a very small proportion meets the requirement of satisfactory outdoor durability (which term refers to both color retention and film integrity), and furthermore a pigment known to give a coating composition of satisfactory durability when used with a particular vehicle (for example, nitrocellulose lacquer) does not necessarily return equally satisfactory performance when formulated with another vehicle (for example, an alkyd resin). Another factor which greatly restricts the choice of pigments for this application is that only a very small number of all the possible combinations yield a color of desired tone and shade. Consequently, only a relatively small number of azo pigment dyestuffs are known which possess the desired combination of satisfactory durability and color to render them of practical interest for use in the manufacture of automotive finishes.

In recent years the so-called Toluidine Maroon (prepared by coupling 4-amino-3-nitro-toluene with the meta-nitroanilide of beta-hydroxynaphthoic acid) has been used extensively in automotive maroon finishes formulated with pyroxylin (nitrocellulose lacquer), because the resulting coating exhibited satisfactory durability and color retention and was a desirable color at the outset. Likewise, the practice of formulating this pigment with a small amount of metallic aluminum (thus giving the so-called "metallic" finish) has grown. Such a formulation imposes even more rigid requirements on the pigment, since many colors are known to return satisfactory durability when formulated in full shade, but fail miserably when formulated in a metallic finish. The popularity of the Toluidine Maroon metallic lacquer finish may be accounted for by its exceedingly pleasing tone and shade and the fact that it shows satisfactory durability under practical conditions.

More recently there has been a growing trend among automotive finishers to forsake the use of nitrocellulose lacquers and to use alkyd resin vehicles instead. Although Toluidine Maroon returns satisfactory durability in a nitrocellulose lacquer finish, it is completely unsatisfactory when formulated in an alkyd resin enamel. Consequently, a great demand exists for a pigment which, when formulated with an alkyd resin, will give tinctorial properties approximating those obtained with a Toluidine Maroon lacquer finish, but which will show satisfactory durability and not suffer from the limitations of the latter.

I have found that the relatively insoluble azo pigment dyestuff obtained by diazotizing 5-nitro-2-amino-anisole in the usual manner and coupling with an alkaline solution of the ortho toluidide of beta-hydroxy-naphthoic acid results in a maroon pigment represented by the formula:

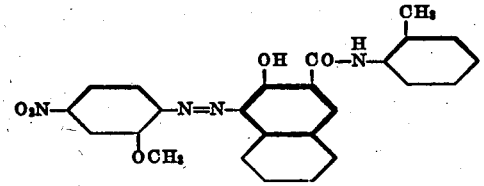

which meets all of the above automotive finishes requirements, and that it possesses certain unusual and unpredictable advantages over previously used and known azo pigments due to a combination of properties which include:

1. Exceptionally good durability in both nitrocellulose lacquer and alkyd resin enamels, when tested in both full shade and metallic finishes, and 2. A combination of dark masstone with yellow undertone and relatively high transparency, which permits the attainment of an exceedingly desirable shade (approximating that obtained with Toluidine Maroon in a metallic lacquer finish), when formulated in a metallic alkyd enamel.

The wholly unexpected properties which the product of this invention exhibits are clearly demonstrated from durability information on two isomeric compounds (namely, those prepared by coupling the diazos of 4-nitro-2-amino-anisole and 3-nitro-4-amino-anisole with the ortho toluidide of beta-hydroxy-naphthoic acid) which establishes that both of these isomeric products, when formulated in full shade alkyd or lacquer enamels, exhibit durability inferior to that shown by corresponding enamels prepared from the pigment of this invention.

To a clearer understanding of the invention, the following examples are given, which are merely illustrative and in no wise limitative, since the specific conditions employed can be varied as will be readily recognized by those skilled in the art:

Example I

An aqueous slurry is prepared from 168 parts of 5-nitro-2-amino-anisole with 1750 parts of water. To this is added a solution containing 108 parts hydrochloric acid, 100%, and the slurry is stirred for ten minutes. This is then cooled to 0–5° C. by the addition of sufficient ice, and this temperature is maintained throughout the diazotization. The volume is adjusted to 3500 parts with ice and water, and diazotization is effected by the addition of 69 parts of sodium nitrite, 100%, dissolved in 500 parts of water. Stirring is continued for an additional 30 minutes, at the end of which period the diazo is clarified. The clarified solution is a clear yellow color and is maintained at 0–5° C. throughout coupling.

A solution of 68 parts of sodium hydroxide in 2500 parts of water is heated to 90° C. To this is added gradually and with constant stirring 290 parts of the ortho toluidide of beta-hydroxynaphthoic acid, and stirring is continued until solution is complete. The solution is then diluted by the gradual addition of water to 5000 parts at 90° C., and this is then added to a solution containing 5.6 parts of sodium hydroxide and 53.5 parts of sodium carbonate diluted with water to 22,500 parts at 30° C. The volume is adjusted to 30,000 parts at 30° C. prior to coupling.

Coupling is effected by adding the diazo at 0–5° C. to the ortho toluidide of beta-hydroxynaphthoic acid solution at 30° C. in 15 minutes. Stirring is continued for 60 minutes, at the end of which time the pH of the slurry is 9.5±0.5. The slurry is then heated to the boil in 30 minutes, and maintained at this temperature for 15 minutes. The hot slurry is filtered immediately, and the press cake washed free of soluble chloride ion. The resulting maroon pigment is dried at 60° C. The yield of dry pigment is 425 parts.

Example II

The following comprises a typical cellulose nitrate coating composition to obtain a maroon lacquer using the pigment of Example I:

| | Percent by weight |
|---|---|
| Maroon pigment (as in Example I) | 5.7 |
| Cellulose nitrate—¼ sec.—visc. | 5.3 |
| Cellulose nitrate—½ sec.—visc. | 5.3 |
| Non-drying alkyd resin solution 60% | 21.1 |
| Dibutyl phthalate | 2.1 |
| Blown castor oil | 1.1 |
| Butyl acetate | 20.4 |
| Ethyl acetate | 6.8 |
| Toluol | 19.1 |
| Butyl alcohol | 6.6 |
| Ethyl alcohol | 6.4 |
| | 100.0 |

The usual method of preparing the coating composition consists in dispersing the pigment in the resin-plasticizer portion of the final mixture together with sufficient solvent to permit working the mass in a ball mill or other grinding device. The remaining ingredients are then incorporated by simple agitation, as in a paddle mixer, to give a homogeneous product.

The above composition is very similar both in color and in durability to a similar composition using the prior art Toluidine Maroon as the pigment.

Example III

This example illustrates a typical alkyd resin coating composition prepared with the pigment of Example I to obtain a synthetic maroon enamel:

| | Percent |
|---|---|
| Maroon pigment (as in Example I) | 9.63 |
| Alkyd resin solution (50% solids) (drying oil modified) | 81.60 |
| Petroleum spirits | 8.02 |
| Lead naphthenate drier (24%) | 0.50 |
| Cobalt naphthenate drier (6%) | 0.25 |
| | 100.00 |

The enamel is prepared by any customary paint grinding technique, such as in a ball mill, a portion of the resin solution and solvents being ground with the pigment, and the remaining ingredients being mixed with the resulting mill base at a later stage.

Steel panels coated with the above enamel after exposure to weathering for one year showed no checking and cracking or other physical failure of the film whereas a Toluidine Maroon enamel under the same conditions showed severe checking and cracking.

Example IV

| | Percent |
|---|---|
| Metallic Maroon enamel: | |
| Synthetic maroon enamel (Example III) | 96.4 |
| Aluminum metal paste, 80%[1] | 3.6 |
| | 100.0 |

[1] Containing 20% inert hydrocarbon solvent such as mineral spirits.

The above two ingredients are mixed thoroughly to assure homogeneity, with the addition of more solvent, if necessary. The pigment composition of the resulting enamel consists of:

| | Percent |
|---|---|
| Maroon pigment (as in Example I) | 97 |
| Metallic aluminum | 3 |
| | 100 |

This metallic maroon enamel when coated on steel panels and exposed to the weather and sunlight for one year showed no physical film failure and substantially no change in color, whereas a similar enamel containing Toluidine Maroon checked and cracked badly and likewise showed severe fading after exposure under the same conditions.

As noted above, my novel organic pigment toner is useful in the preparation of relatively durable coating compositions, being outstandingly useful in the production of stable, synthetic resin coatings through dispersion of the pigment in synthetic resin vehicles. Resinated coating compositions containing an alkyd resin are well-known, and comprise certain types of polyhydric alcohol-polybasic acid resins, especially the so-called modified polyhydric alcohol-polybasic acid resins or resinous condensation products obtained by reacting one or more polyhydric alcohols and one or more polybasic acids with one or more modifying ingredients, such as drying oils, semi-drying oils, synthetic drying oils, and monobasic acids, etc. One notable, common example of these resins comprises the condensation products of glycerol and phthalic anhydride with linseed oil. These synthetic resin vehicles or solutions are usually prepared by heating a mixture of the resin-producing ingredients, other than solvents, at temperatures above the melting point and until completion of the resinification. The properties of the resin can be modified as desired by varying the ingredients and conditions of preparation. Among specific modified alkyd resins contemplated for production hereunder may be mentioned melamine or urea-formaldehyde-modified drying oil alkyds, melamine modified non-oxidizing and urea-formaldehyde-modified non-oxidizing oil alkyd resins. Although particularly adapted for use in the preparation of alkyd resin coatings, my pigment is, as stated, also useful in the preparation of nitrocellulose lacquers and for the preparation of oil type paints as well. Accordingly, it is to be understood that use of the pigment of this invention is contemplated in all types of coating compositions, including those referred to and described in U. S. Reissue Patent 21,427, as well as in compositions of the type referred to in U. S. Patent 2,225,665.

I claim as my invention:

1. A new, insoluble azo maroon pigment having the formula:

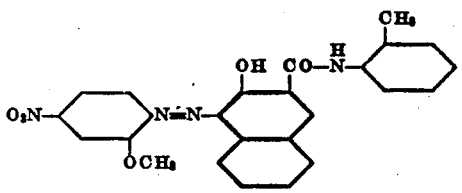

2. A durable synthetic alkyd resin coating composition containing as an essential pigmenting ingredient the insoluble maroon azo dyestuff having the formula:

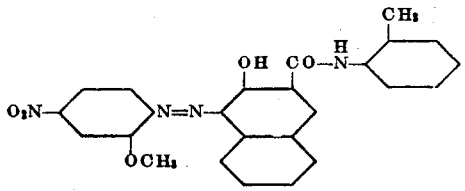

3. A durable synthetic alkyd resin coating composition containing as pigmenting igredients a minor proportion of powdered aluminum and a major proportion of the insoluble maroon azo dyestuff having the formula:

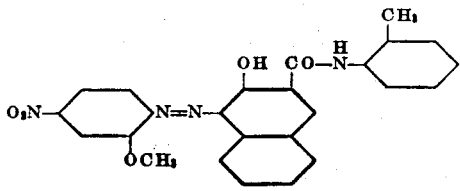

JOSEPH H. COOPER.

REFERENCES CITED

The following references are of record in the file of this patent:

UNITED STATES PATENTS

| Number | Name | Date |
|---|---|---|
| 2,173,920 | Siegel | Sept. 26, 1939 |
| 2,302,305 | Farrell | Nov. 17, 1942 |

Disclaimer 2,508,447.—*Joseph H. Cooper*, San Francisco, Calif. AZO PIGMENT AND ALKYD RESIN COATING COMPOSITIONS CONTAINING SAME. Patent dated May 23, 1950. Disclaimer filed Jan. 14, 1952, by the assignee, *E. I. du Pont de Nemours & Company*.

Hereby enters this disclaimer to claim 1 of said patent.
(*Official Gazette February 12, 1952.*)